Sept. 20, 1966 J. F. ANNETT 3,273,374
FILTERS FOR LIQUIDS
Filed Nov. 26, 1963 2 Sheets-Sheet 2
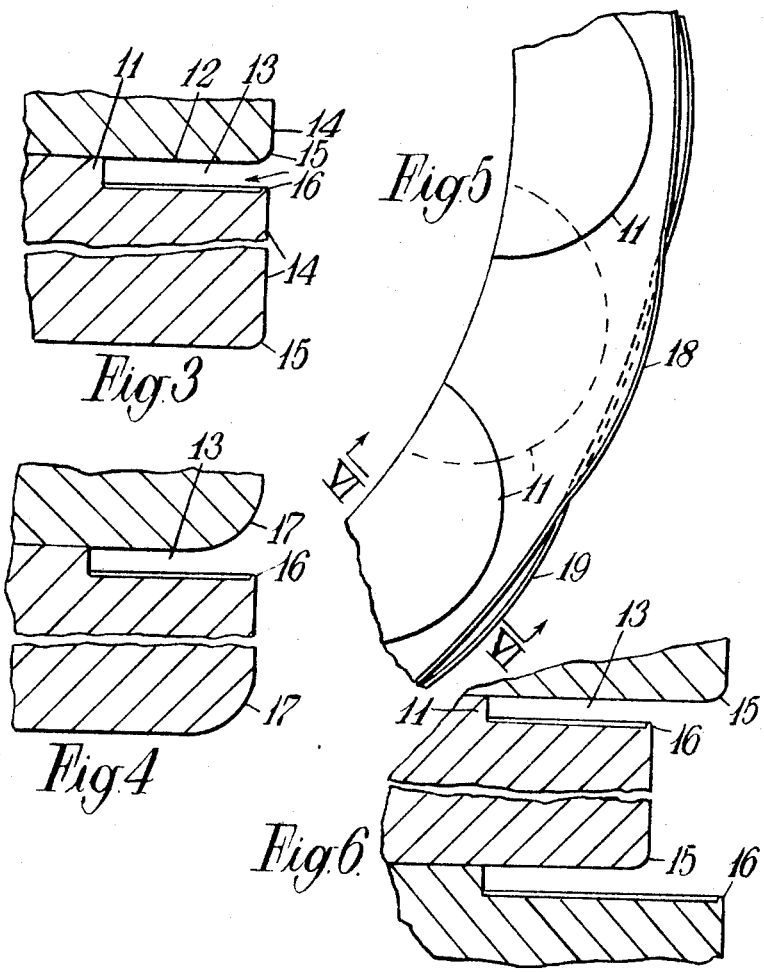

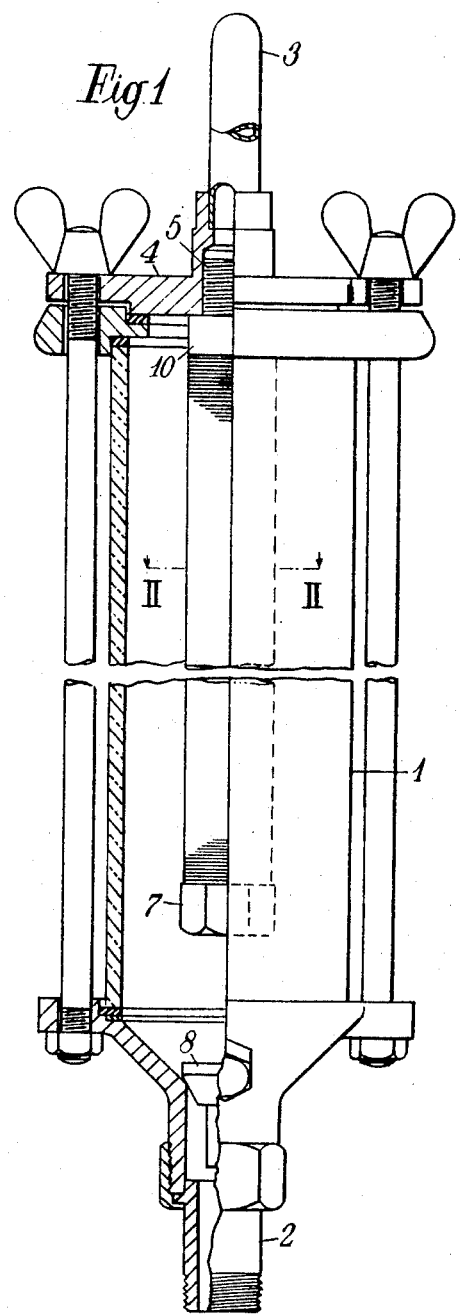

3,273,374
FILTERS FOR LIQUIDS
John Frederick Annett, Hounslow, Middlesex, England, assignor to The Metafiltration Company Limited, Hounslow, England, a British company
Filed Nov. 26, 1963, Ser. No. 326,140
Claims priority, application Great Britain, Feb. 28, 1963, 8,118/63
1 Claim. (Cl. 72—340)

This invention relates to filtering devices of the kind in which a filter bed of suitable powdered material is formed on a liquid-permeable support so that liquid to be filtered, that is to say, the filterand can be forced through the filter bed, and through the support to an outlet.

Filtering devices of this kind are very well known and are used for a wide variety of purposes. Difficulties have been encountered in connection with the filtering of more or less glutinous materials especially where extremely fine filtering is required as in the brewing industry.

In some cases the permeable support in which the filter bed or so-called "preform" is built, is of finely woven wire mesh or finely perforated metal sheet forming a wall of a relatively shallow plate furnished with an outlet. A serious disadvantage of this kind of structure is that there is considerable difficulty in supporting the relatively large sheet of mesh or perforated plate so that it does not move under the pressure exerted by the liquid to be filtered. The fine filtration of relatively glutinous material tends to be associated with a rather high back pressure on the filter bed, this back pressure increasing progressively until such time as the bed has to be renewed. Fluctuations in this applied pressure will in practice cause the screen to move slightly, with the result that the preform, or applied bed of filter material, is disturbed, sometimes causing it to be cracked but in any case loosening some of the powdered material constituting the bed. This loosened material finds its way through the screen, so that an additional so-called trap filter is required.

In a preferred construction of filter, the screen is replaced by an edge filter constituted by a stack of filter discs formed on one face with projections which serve to space the discs apart so that liquid can flow readily therebetween, the discs being formed with a central opening for a coaxial support stem which is channelled or otherwise shaped to collect and feed to an outlet the liquid flowing inwardly between the discs. The stack of discs is clamped on the support stem for example by the latter being shouldered towards one end and screw threaded at the other to receive a washer and nut. This construction obviously provides an extremely rigid support for the preform of filter bed, which cannot yield perceptibly in response to fluctuations in the applied pressure. The preform is applied to the stack of discs by supplying a suspension of filter material to the exterior of the stack under pressure.

In general, where a stack of filter discs is employed, for example, in the filtering of oil or water, the results are reproducible and consistent to a high degree. No difficulty arises in applying a uniform layer of filter material to the outside of the discs, because ample pressure is available for feeding the suspension to the stack of discs at a high rate, and no breaking away of the inner face of the filter bed is experienced under fluctuating pressure. However, some difficulties have arisen where it is required to filter very large volumes of liquid containing very fine matter in suspension, especially where this is of a somewhat glutinous nature. For extremely fine filtration such as is required in the brewing industry, a comparatively large filtering area is necessary in relation to throughput, and this means that, unless the pumping arrangements are made disproportionately large in relation to the filtering rate, the filter bed will be applied comparatively slowly. It is found that, if a filter bed is applied slowly to a stack of filter discs as hitherto constructed, irregularities appear in the bed to such an extent that in places, the bed is too thin to function with the required efficiency. Even if a layer of comparatively coarse filter material is applied first followed by a layer of finer material, the first layer is at places so thin that the particles of the finer material and the particles of relatively glutinous matter suspended in the filtrand are able, under conditions of relatively high back pressure, to find their way into the filtrate. It has been noted that, in some cases, where the filter bed has been applied slowly, that small areas are left where the discs themselves are still visible, although the same stack of discs is covered by a uniform, sound filter bed when the latter is applied rapidly.

It is an object of the invention to provide an improved construction of filter disc so that a stack thereof can be made to provide a filter bed support which can be coated satisfactorily even at low rates of flow. Another object is to provide a filter of the kind referred to which can be used successfully in the brewing industry without the need for a trap filter.

The invention consists in a disc for an edge filter, in the form of an annulus having one side which is substantially flat, having the opposite side formed with shallow projections to define, when pressed against the flat side of a like disc, radial passageways for liquid, and having a substantially cylindrical edge formed on one side with a rim or overhanging which is substantially shallower than said projections.

It is found that, when a stack of discs as described in the preceding paragraph, mounted on a channelled support, is used as a base of a filter bed of material such as diatomaceous silica, the bed can be applied much more slowly than was possible heretofore without giving rise to excessively thin or bare patches. Preferably, as is customary in the assembly of the stack, the assembly of discs is laid sideways on a trough or other guide to align individual discs before the stack is finally tightened.

In producing the discs, a stamping operation defines the circumferentially spaced projections, which will generally be rounded or V-shaped with the base towards the inner circumference, defining passageways between adjacent discs which diverge in a radially outward direction. The height of the projections will of course be such that the filter bed can be supported, and in a typical example, the top face of the projections may stand from four thousandths of an inch above the remainder of the disc face. In the stamping operation the edge of the disc is frequently deformed to some extent, in that where the maximum pressure has been applied, that is to say between the projections, the material of the disc tends to be squeezed in a radially outward direction. Thus, the edge of the disc, as initially formed, is not truly cylindrical, but is rather undulatory in form. The disc is generally punched from sheet metal, and this punching operation causes a bur to form at the edge of the disc. To remove this bur, a tumbling operation may be resorted to, and in practice, this may have the result that one end at least of the disc edge is appreciably rounded. In this respect also the disc edge is not truly cylindrical. In producing the improved disc of the present invention, some degree of aftertreatment will frequently be necessary to remove or reduce these departures from the substantially cylindrical form of the disc edge.

The rim or projection is preferably located on the same side of the disc as are the projections which serve to space the disc apart. The rim or projection will in effect represent a slight restriction at the radially outer end of the passageways in the edge filter between the aforesaid projections, although the actual restriction it imposes may scarcely be measurable. The precise height of the upstanding rim is not critical, but the preferred range is between ¼ and ⅛ of the height of the projections.

The invention will be described further with reference to the accompanying drawings, of which:

FIGURE 1 is a part sectional view of a filter in accordance with the invention, prior to the application of a preform;

FIGURE 2 is a sectional view on the line II—II of FIGURE 1;

FIGURE 3 is a scrap sectional view on the line III—III of FIGURE 2 on a larger scale;

FIGURE 4 is a scrap sectional view similar to FIGURE 3 illustrating a defective form of disc;

FIGURE 5 is a scrap sectional view, taken in an axial direction, showing two defective discs superposed on one another, and FIGURE 6 is a sectional view on the line VI—VI of FIGURE 5.

The complete filter of the present invention comprises, in the example shown in FIGURE 1, an outer casing 1 furnished with an inlet 2 and an outlet 3. The outlet 3 is secured to an end plate 4 into which is screwed a stem 5 which is fluted (FIGURE 2) to define collecting channels 6 communicating with the outlet 3, the stem terminating in a head 7. Generally, the inlet 1 will be associated with a non-return valve member 8. A stack of discs 9 is mounted on the stem 5, between the head 7 and a threaded locking washer 10.

Referring more particularly to FIGURES 2 and 3, each disc 9 has one face which has been subjected to a stamping operation to define flat-topped projections 11. In the stack of discs, the flat top of one set of projections 11 is pressed against the flat face 12 of an adjoining disc to define passageways 13. As can be seen from FIGURES 2 and 3, these passageways diverge outwardly and provide a means whereby liquid from within the casing 1 can be forced through the stack of discs and into the collecting channels 6. The outer edge 14 of each disc is substantially cylindrical, being slightly rounded at one end 15 whilst being formed with a rim or overhang 16 at the other end. The rim 16, as can best be seen with reference to FIGURE 3, is shallower than the projection 11 and does not seriously obstruct the passageways 13 the direction of flow in which of the medium being filtered is indicated by the arrow.

It is found in practice that a filter constructed as illustrated with reference to FIGURES 1-3 can be coated with a desirable uniform layer to filter medium at a comparatively slow rate. The layer of filter medium may be for example ⅛ of an inch thick. By comparison, a stack of filter discs as hitherto constructed will generally require to be coated at a rate which is several times higher in order to achieve a comparable uniformity of coating.

FIGURES 4-6 illustrate certain defects which were present in prior art filter discs but which are preferably removed in order that the rim or overhang characterising the disc of the present invention, may exercise its desirable effect.

Referring to FIGURE 4, the case is illustrated where the edge of the disc, on the face opposite the rim or overhang, is unduly rounded instead of being left substantially square. This rounded edge, designated by numeral 17, is seen to give rise to a relatively wide opening at the inlet of the passageway 13; this opening is so wide that the overhang 16 is by comparison completely dwarfed and exercises much less effect than it otherwise would.

Referring to FIGURES 5 and 6, the effect here illustrated is of the distortion of the material of the disc which arises in the stamping operation. Between the projections 11, the material of the disc tends to bulge radially outwardly as at 18. An underneath disc may likewise exhibit a bulge 19. The discs are stacked one above the other at random (this being in any case a desirable feature in order to achieve a random distribution of the openings to the passageways 13) and it will in general happen that the edges of successive discs are therefore not in alignment. This lack of alignment is illustrated in FIGURE 6 where the rim 16 is displaced outwardly from the edge 15 giving, once again, a relatively wide opening to the passageway 13 dwarfing the effect of the rim 16.

FIGURES 4-6 are not of course drawn to scale, but they serve to illustrate the sort of effect which will arise with an increasing departure from a truly cylindrical form of the edge 14. Whether or not this edge has a sufficiently cylindrical form, as is preferred in accordance with the present invention, can be determined in a particular case only by comparison. That is to say, if it is suspected that the edge may not be sufficiently true, all that is required is to prepare a stack of discs in which the machining or other treatment has been conducted more accurately and then compare this stack in its performance with the suspect sample. If there is an improvement, then it follows that the original sample was not sufficiently true as regards the cylindrical form of the edge to give the optimum benefits of the present invention.

It will be understood that the filter of the present invention, and in particular the component discs may be made of any suitable material. Almost invariably the discs will be of metal or plastics material, the particular material chosen depending upon the nature of the material to be filtered. For the purpose of filtering beer, where the present invention is perhaps of greatest importance, the discs will normally be of stainless steel.

Various methods are of course available for manufacturing filter discs having the form described herein, depending upon the particular metal or plastics material and, especially, upon the hardness of the metal or plastics material to be used. With relatively soft metals, or plastics materials, the discs can be made directly in the pressing or stamping operation; in the case of extremely hard metals the discs may be machined, for example on a lathe, or by centreless grinding, so that a bur is formed on each face of the disc, after which the bur on one face is removed and on the other face is cut down to the required size.

What is claimed is:

A method of making a disc for an edge filter, which comprises stamping out from sheet metal, an initial disc in the form of an annulus having one side which is substantially flat whilst the opposite side is formed with shallow projections to define, when pressed against the flat side of a like disc, radial passageways for liquid, machining the initial disc to make it substantially circular, the machining operation forming a bur on each side of the circular disc edge, and then removing the bur from one side whilst diminishing the bur on the other side.

References Cited by the Examiner

UNITED STATES PATENTS

| 2,826,309 | 3/1958 | Forman et al. | 210—488 |
| 3,006,478 | 10/1961 | Mueller | 210—488 X |

FOREIGN PATENTS

| 1,163,580 | 4/1958 | France. |
| 907,166 | 3/1954 | Germany. |
| 366,031 | 1/1963 | Switzerland. |

REUBEN FRIEDMAN, *Primary Examiner.*

D. M. RIESS, *Assistant Examiner.*